United States Patent [19]

Salgues

[11] Patent Number: 5,271,278
[45] Date of Patent: Dec. 21, 1993

[54] CHAMPAGNE PRESSURE GAUGE

[76] Inventor: Michel J. Salgues, P.O. Box 142, Philo, Calif. 95466

[21] Appl. No.: 837,073

[22] Filed: Feb. 14, 1992

[51] Int. Cl.⁵ .................................. G01L 7/00
[52] U.S. Cl. ......................... 73/756; 116/266; 73/700; 73/714
[58] Field of Search ........... 73/700, 756, 864.01, 73/298, 714; 116/266

[56] References Cited

U.S. PATENT DOCUMENTS 4,515,019  5/1985  Woodfill ........................... 73/756
5,007,287  4/1991  Nagai ............................. 73/864.01

Primary Examiner—Donald O. Woodiel
Attorney, Agent, or Firm—Larry D. Johnson

[57] ABSTRACT

A champagne pressure gauge provides a small tube attached to the inside surface of a bidule inserted into a champagne bottle, such that as the pressure from fermentation increases, liquid is forced up the tube. The liquid level in the tube can be observed through the neck of the bottle, giving a non-intrusive, non-destructive measurement of pressure in the bottle.

11 Claims, 7 Drawing Sheets

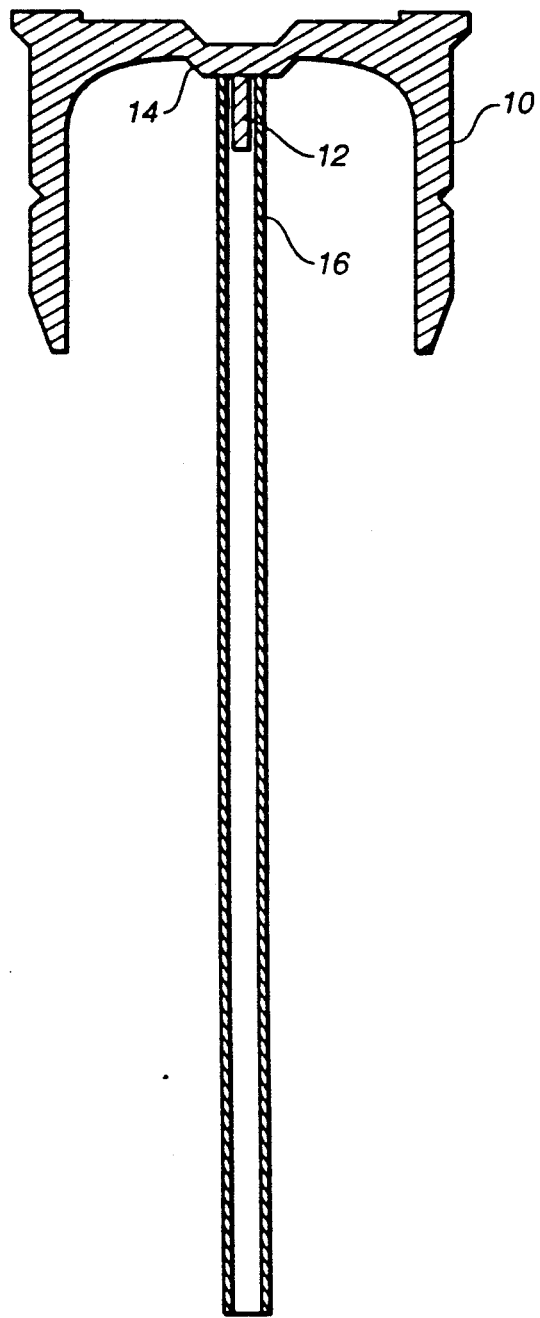
FIG._1
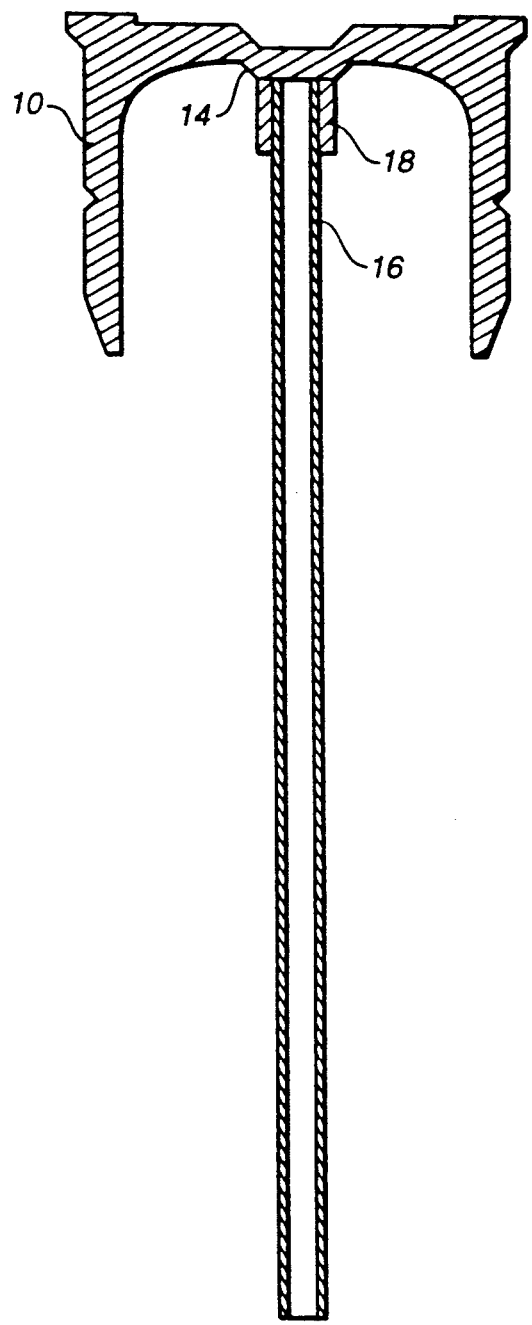
FIG._2

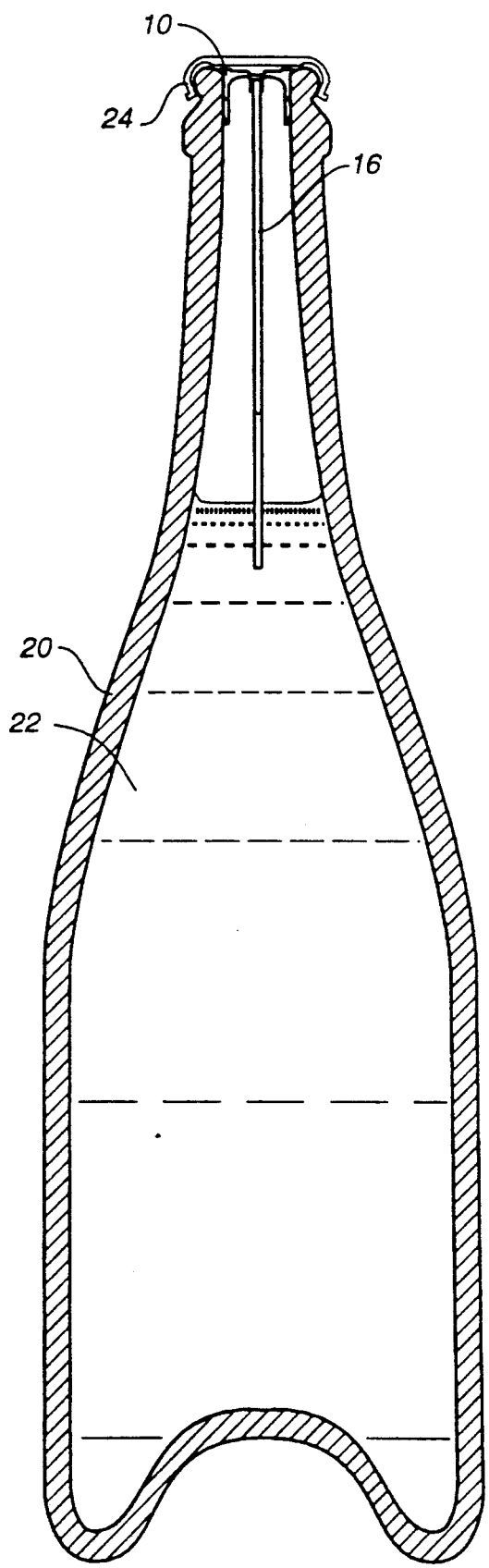
FIG._3
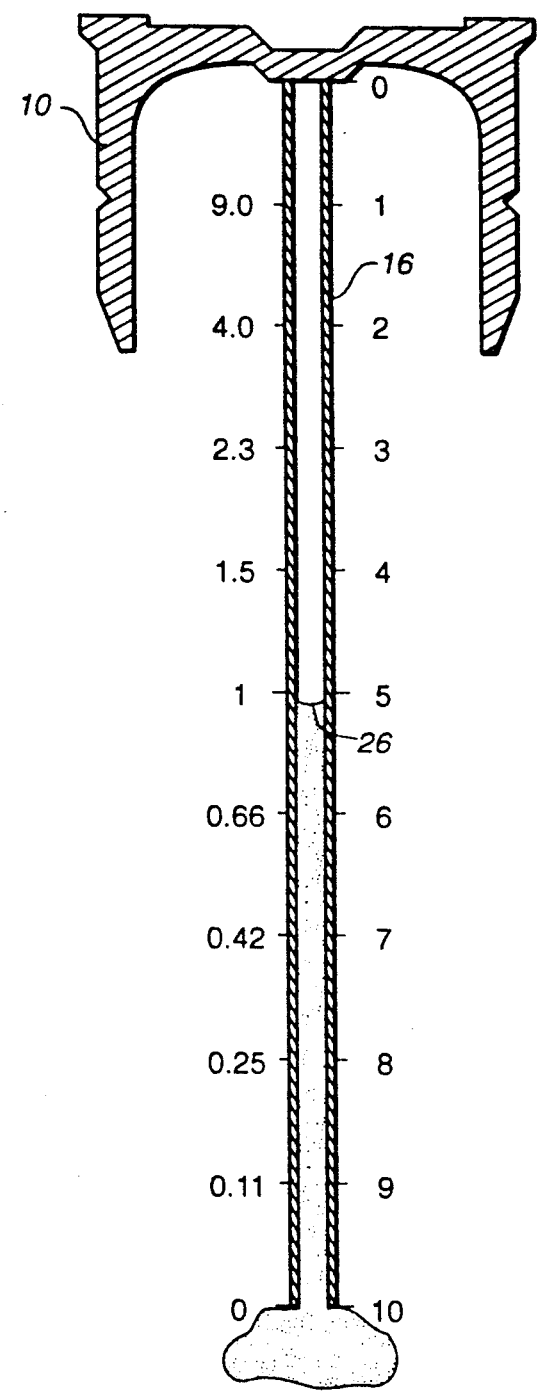
FIG._5

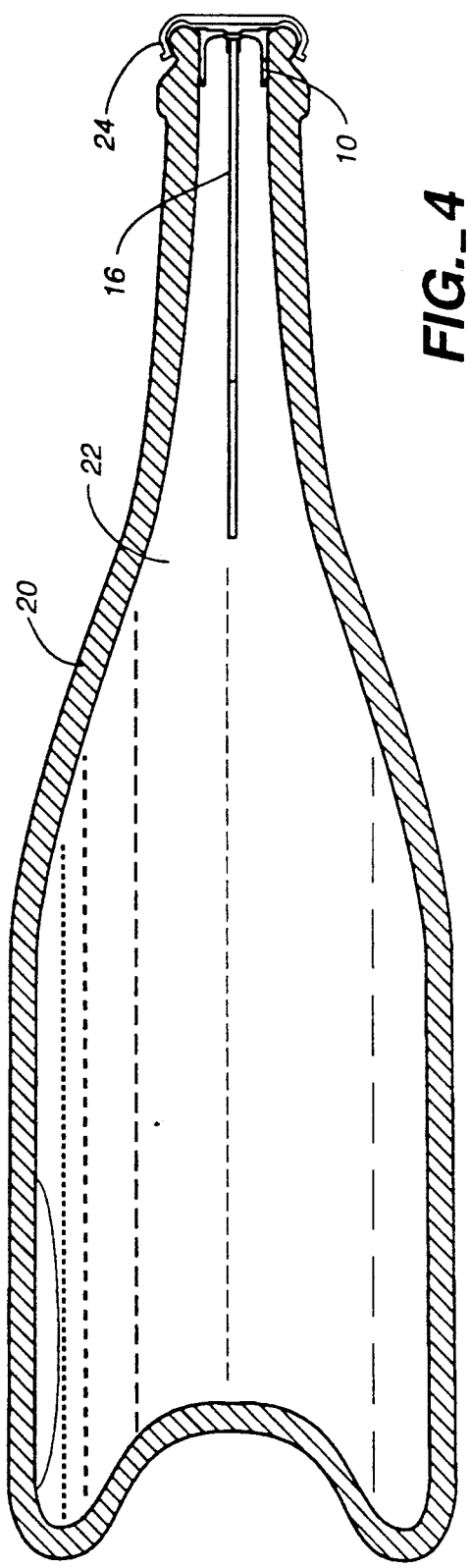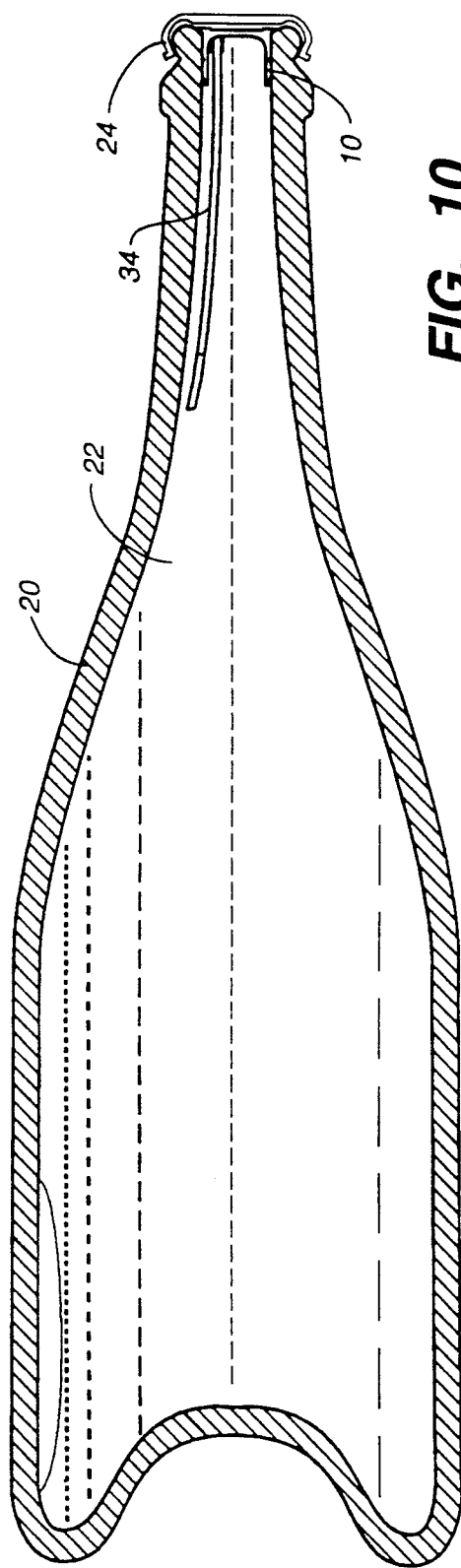

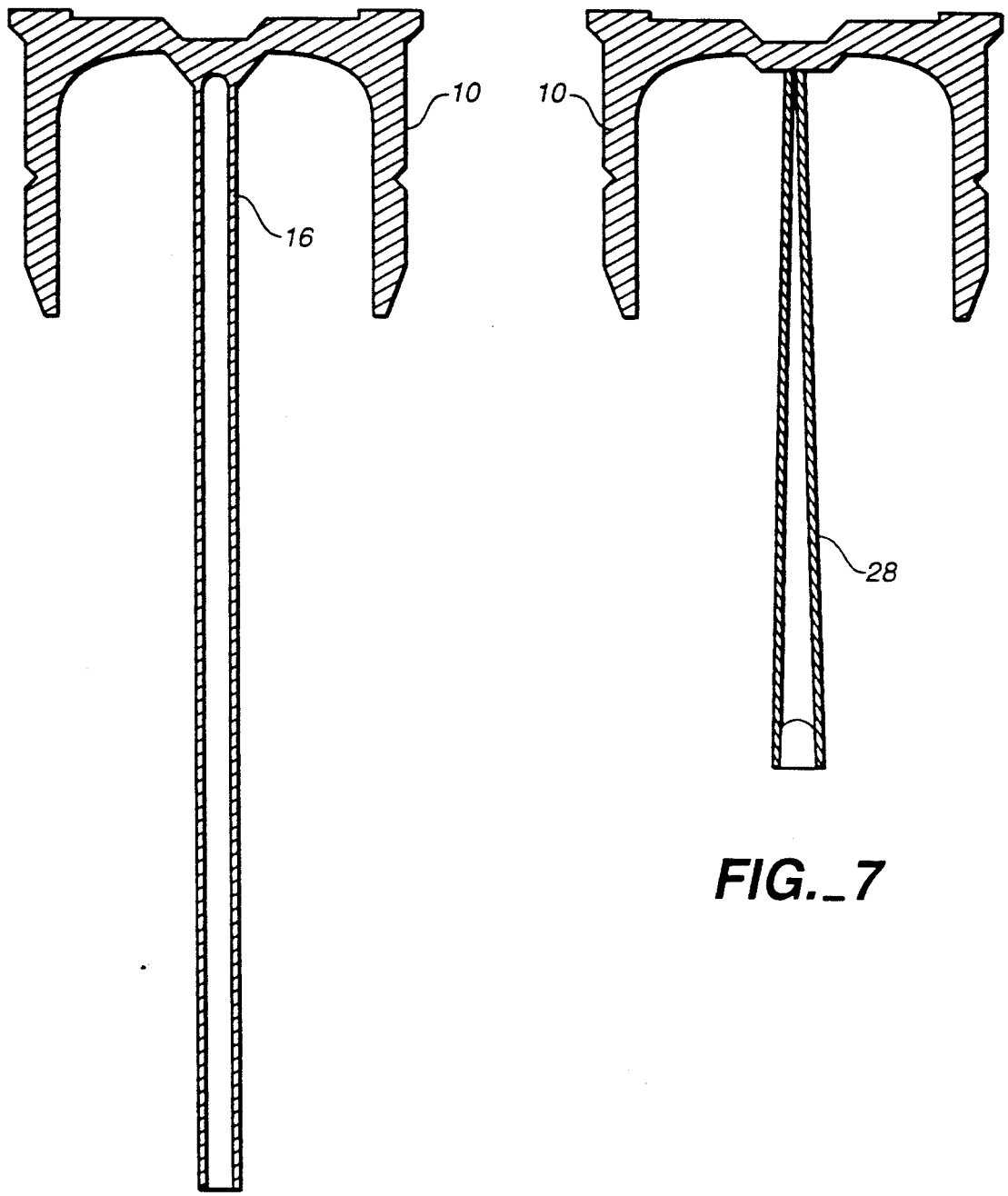
FIG._6
FIG._7

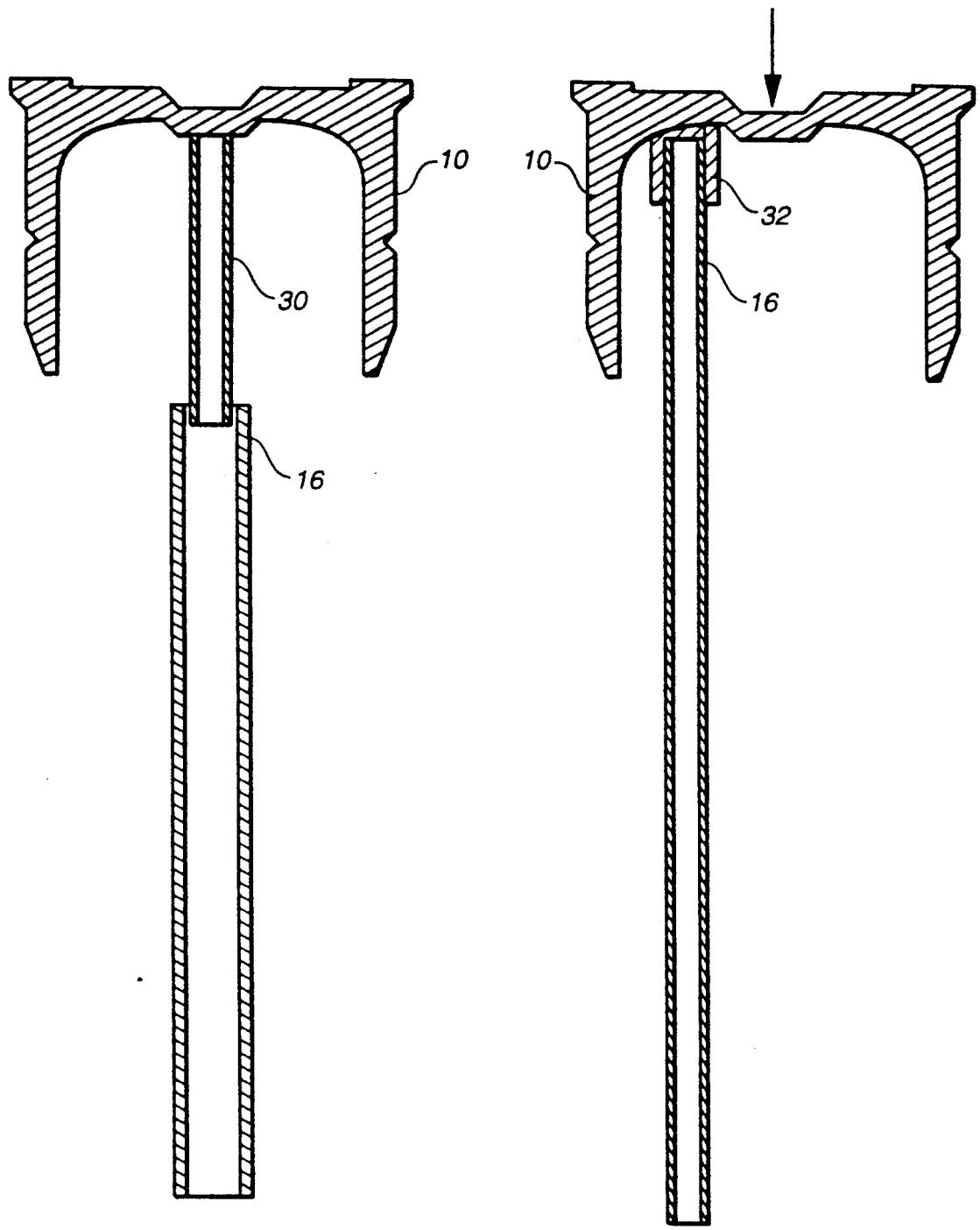
FIG._8     FIG._9

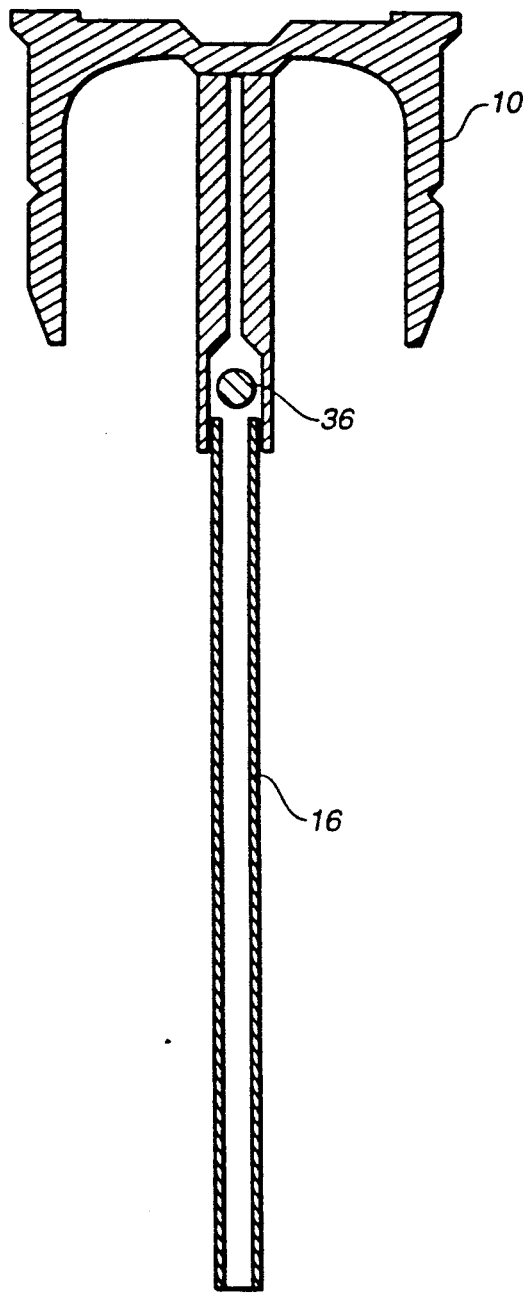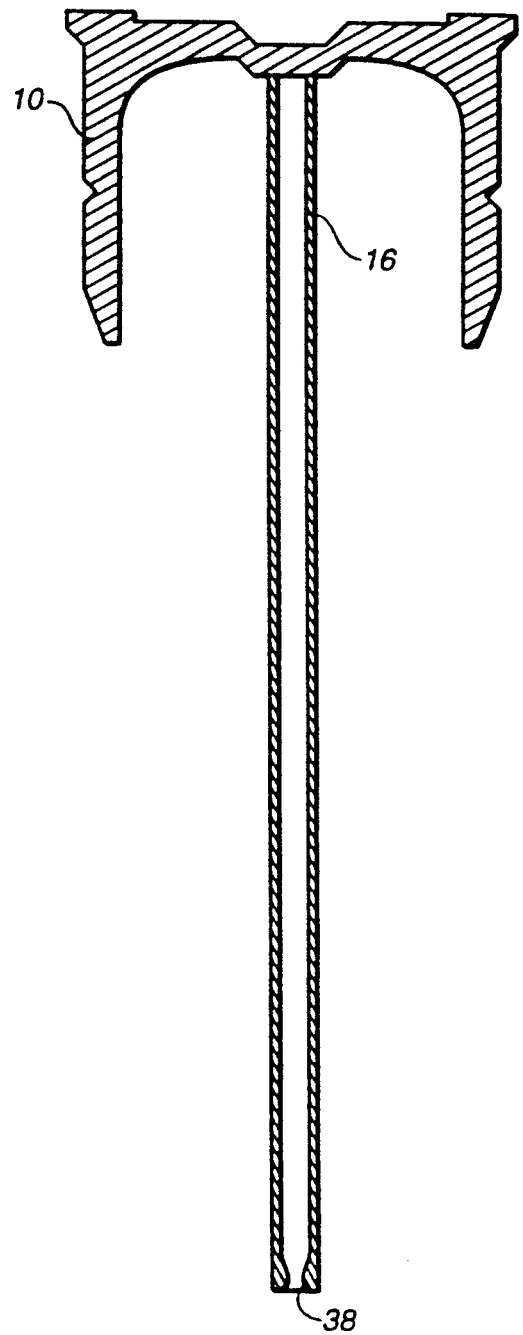
FIG._11A   FIG._11B

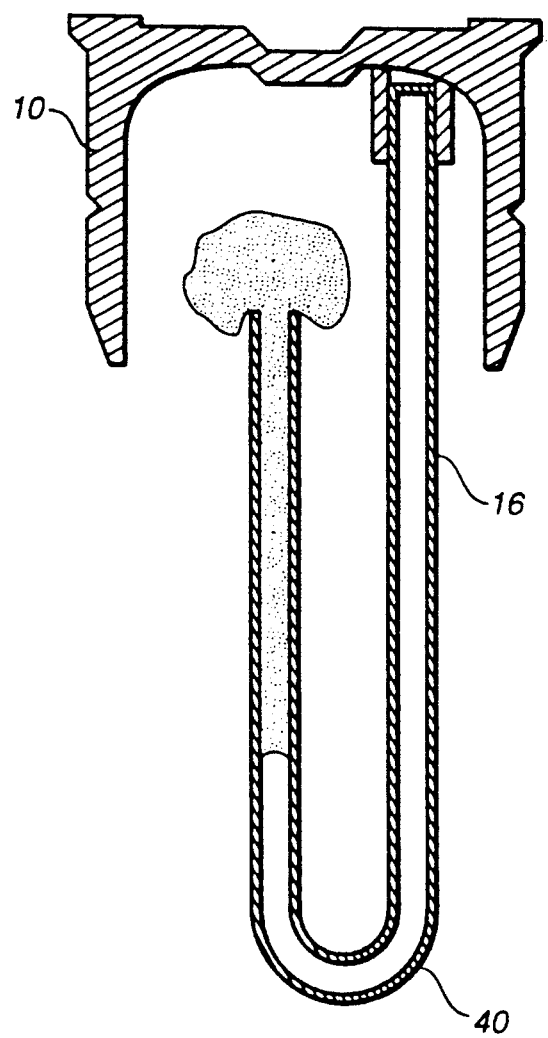
FIG._11C

CHAMPAGNE PRESSURE GAUGE

BACKGROUND OF THE INVENTION

1. Field of the Invention

This invention relates generally to bottles and closures, and more specifically to an improved pressure gauge device for use in the champagne fermentation process.

2. Description of the Prior Art

In one step of the champagne making process, a small cap or "bidule" containing sugar is inserted into the neck of the champagne bottle. The champagne then begins fermenting, creating alcohol and carbon dioxide, thereby generating pressure inside the bottle. Known pressure measurement techniques require penetration or removal of the bottle cork.

SUMMARY OF THE INVENTION

The champagne pressure gauge of this invention provides a small tube attached to a bidule, such that as the pressure from fermentation increases, liquid is forced up the tube (the air in the tube is compressed). The liquid level in the tube can be observed through the neck of the bottle, giving a non-intrusive, non-destructive measurement of pressure in the bottle.

This device is internal and non-destructive. It does not interfere with any subsequent operation related to sparkling wine or sparkling beverage production. This device allows the user to control the secondary fermentation in the bottle by measurement of the internal pressure. Its advantages as compared to the traditional pressure gauge (also called aphrometer), which punctures the crown cap and the bidule include:

A. It is simpler and cheaper to manufacture.

B. It is an internal device, as opposed to an external device, therefore it does not interfere with subsequent operations of champagne production, e.g., piling bottles in a regular pattern, shaking the bottles (also called poignetage), riddling the bottles (rotating the bottles progressively neck down in order to move the yeast sediment in the neck of the bottle), and disgorging (removal of the sediment without removing the liquid) by hand or with automatic equipment.

C. It provides a non-destructive test as opposed to a destructive test, therefore, the cost of the test is considerably reduced.

D. Because of the reduced cost of the test, it is possible to increase the frequency of measurement within a production lot and get more information on the regularity of the secondary fermentation. Also, in case of a partially incomplete fermentation, it becomes possible a posteriori to sort the rejected lots from the acceptable ones.

E. The device is more sensitive at low pressure (the displacement of the meniscus per increment of pressure is greater at lower pressure than at higher pressure), which is the first and most critical step of the fermentation. It gives a more early information in the case of a difficult fermentation, which allows the user to take an earlier and more efficient action for correcting the fermentation conditions.

F. If used in every single bottle of a lot, the device permits the user to control individually the pressure in each bottle and to stop the fermentation at the desired level of pressure and alcohol and residual sugars, for example by riddling or by freezing the bottle, without any addition of sugar after disgorging as is required in the traditional method.

As an internal device, the invention also gives opportunities for new technologies of wine making. Without the tube, the modified bidule can be used for introducing, holding in a desired position in the bottle, and removing during disgorging any device, such as for testing (pressure, specific gravity, etc.) fermenting (encapsulated yeast or yeast on a support), or trapping yeast or a yeast support for disgorging without freezing the neck of the bottle.

BRIEF DESCRIPTION OF THE DRAWINGS

FIG. 1 is a side elevation cross-sectional view of one embodiment of a champagne pressure gauge of this invention, illustrating a bidule body, a male fastening portion affixed to the bidule body inside surface, and a tube portion inserted onto the male fastener portion;

FIG. 2 is a side elevation cross-sectional view of an alternate embodiment of a champagne pressure gauge of this invention, illustrating a female fastener portion affixed to the bidule body inside surface, and a tube portion inserted into the female fastener portion;

FIG. 3 is a side elevation cross-sectional view of the champagne pressure gauge of FIG. 2 as installed in a vertically oriented bottle filled to a typical level with champagne or other liquid to be fermented, and illustrating the liquid level rising in the tube as pressure increases in the bottle;

FIG. 4 is a side elevation cross-sectional view of the champagne pressure gauge of FIG. 2 as installed in a horizontally oriented bottle, again filled to a typical level with champagne or other liquid to be fermented, also illustrating the liquid level rising in the tube as pressure increases in the bottle;

FIG. 5 is a side elevation cross-sectional view of a champagne pressure gauge of this invention, illustrating typical gradation indicia for the tube;

FIG. 6 is a side elevation cross-sectional view of an alternate embodiment of the champagne pressure gauge of this invention in which the tube is permanently affixed to the bidule;

FIG. 7 is a side elevation cross-sectional view of an alternate embodiment of the champagne pressure gauge of this invention in which the tube bears converging (conical) walls;

FIG. 8 is a side elevation cross-sectional view of an alternate embodiment of a champagne pressure gauge of this invention, illustrating a male fastener portion in the form of a secondary tube to increase the overall length and corresponding accuracy of the device;

FIG. 9 is a side elevation cross-sectional view of an alternate embodiment of a champagne pressure gauge of this invention, illustrating an off-center fastener arrangement;

FIG. 10 is a side elevation cross-sectional view of an alternate embodiment of a champagne pressure gauge of this invention, illustrating a non-linear tube; and FIGS. 11a-c are side elevation cross-sectional views illustrating alternate structures to prevent or reduce reinjection of the liquid in the tube upon disgorging (depressurization);

FIG. 11a illustrates a check valve arrangement in the tube to reduce flow;

FIG. 11b illustrates a flow restriction in the tube; and

FIG. 11c illustrates an elbow or bend formed in the tube to redirect flow.

DETAILED DESCRIPTION OF A PREFERRED EMBODIMENT

The present invention is a modification to plastic closures commonly known as bidules, used for capping champagne (or sparkling wine, or any other juice or beverage) to be fermented in the bottle, in conjunction with a crown cap before the secondary fermentation. FIGS. 1 and 2 illustrate that the modifications include the addition of a fastener inside the bidule, in order to attach any device to the bidule and inside the bottle, and the attachment of a transparent tube (e.g., diameter 0.5 to 1.5 mm). The length of the tube is such that its open end is immersed into the liquid in any position of the bottle (e.g., 80 mm or more), and particularly when the bottle is lying on its side.

FIG. 1 illustrates a bidule body 10, a male fastening portion 12 affixed to the bidule body inside surface 14, and a tube portion 16 inserted onto the male fastener portion. FIG. 2 illustrates a female fastener portion 18, such that the tube 16 is inserted into the fastener.

FIGS. 3 and 4 illustrate that after filling the bottle 20 with a mixture 22 of the yeast culture and the medium to be fermented (e.g., wine+sugar), the bidule 10 with its attached tube 16 is inserted in the neck of the bottle and a crown cap 24 is installed over the top. Initially, the tube is filled only with air (or other gas). As the yeast starts to ferment the sugar, carbon dioxide is released and the internal pressure in the bottle increases. The pressure increase pushes the liquid into the tube in order to reach a pressure equilibrium.

FIG. 5 illustrates that the displacement of the liquid meniscus 26 into the tube gives a measure of the evolution of the fermentation in the bottle (e.g., yeast activity, lag period, kinetic of sugar metabolized and carbon dioxide released, and final concentration). For example, a displacement of one-half of the tube indicates a relative pressure increase of one bar. The tube may be graduated linearly or directly in terms of relative pressure.

FIG. 6 illustrates that the tube 16 and the bidule 10 can be molded as one piece only.

FIG. 7 illustrates that the tube may have a conical shape 28 instead of a cylindrical shape, in order to modify the sensitivity of the device according to the pressure level.

FIG. 8 illustrates that the tube may be extended by incorporation of a second tube 30 (analogous to a male fastener portion) in order to increase the accuracy of the device.

FIG. 9 illustrates that a fastener 32 inside the bidule can be placed out of the center so as not to interfere with a pressure measurement by a traditional pressure gauge, which usually punctures a hole in the center of the bidule.

FIG. 10 illustrates that a tube 34 can be inclined or bent in order to stay close to the glass wall of the bottle 20 near the shoulder and make the reading of the tube easier.

FIGS. 11 a-c illustrate methods to prevent the liquid inside the tube from being reinjected back into the bottle at disgorging (i.e., at opening of the bottle under pressure). FIG. 11a illustrates a check valve 36, FIG. 11b illustrates a restriction 38 in the diameter of the tube which will reduce the flow backwards, and FIG. 11c illustrates an elbow 40 which will direct the flow outside of the bottle (it can also be used for increasing the length of the tube, and therefore the accuracy of the pressure reading).

While this invention has been described in connection with preferred embodiments thereof, it is obvious that modifications and changes therein may be made by those skilled in the art to which it pertains without departing from the spirit and scope of the invention. For example, a piston or other impermeable barrier can be placed in the tube in order to separate the liquid from the gas in the tube. Accordingly, the scope of this invention is to be limited only by the appended claims.

What is claimed as invention is:

1. A pressure gauge for a bottle containing a fermenting liquid, said bottle having a neck portion, said pressure gauge comprising:
    a body portion for insertion into said bottle neck portion, said body portion having an inside surface;
    a tube segment having a closed end and an open end; and
    fastening means for attachment of said tube segment closed end to said body portion inside surface, so that said tube segment open end is immersed in said fermenting liquid, and said fermenting liquid enters said open end and moves within said tube segment in response to pressure within said bottle.

2. The pressure gauge of claim 1 wherein said fastening means comprises a male fastener portion, and said tube segment closed end is inserted onto said male fastener portion.

3. The pressure gauge of claim 1 wherein said fastening means comprises a female fastener portion, and said tube segment closed end is inserted into said female fastener portion.

4. The pressure gauge of claim 1 wherein said tube segment bears indicia indicative of pressure.

5. The pressure gauge of claim 1 wherein said tube segment closed end is permanently affixed to said body portion inside surface.

6. The pressure gauge of claim 1 wherein said tube segment bears conical walls.

7. The pressure gauge of claim 2 wherein said male fastener portion comprises a tube.

8. The pressure gauge of claim 1 wherein said body portion inside surface has a enter, and said tube segment closed end is affixed to said body portion inside surface adjacent said center.

9. The pressure gauge of claim 1 wherein said tube segment is non-linear.

10. The pressure gauge of claim 1 wherein said tube segment bears a check valve member.

11. The pressure gauge of claim 1 wherein said tube segment bears a flow restriction portion.

* * * * *